United States Patent
Sellam et al.

(10) Patent No.: US 12,073,189 B2
(45) Date of Patent: *Aug. 27, 2024

(54) LEARNED EVALUATION MODEL FOR GRADING QUALITY OF NATURAL LANGUAGE GENERATION OUTPUTS

(71) Applicant: Google LLC, Mountain View, CA (US)

(72) Inventors: Thibault Sellam, New York City, NY (US); Dipanjan Das, Jersey City, NJ (US); Ankur Parikh, New York, NY (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/205,018

(22) Filed: Jun. 2, 2023

(65) Prior Publication Data

US 2023/0306209 A1  Sep. 28, 2023

Related U.S. Application Data

(63) Continuation of application No. 17/112,285, filed on Dec. 4, 2020, now Pat. No. 11,704,506, which is a
(Continued)

(51) Int. Cl.
*G06F 40/58* (2020.01)
*G06F 18/21* (2023.01)
(Continued)

(52) U.S. Cl.
CPC ............ *G06F 40/58* (2020.01); *G06F 18/214* (2023.01); *G06F 18/2178* (2023.01);
(Continued)

(58) Field of Classification Search
CPC .... G06F 40/58; G06F 18/214; G06F 18/2178; G06F 40/30; G06F 40/51; G06F 40/44;
(Continued)

(56) References Cited

U.S. PATENT DOCUMENTS

| 11,551,002 B2 | 1/2023 | Sellam et al. |
| 2012/0101804 A1* | 4/2012 | Roth ....................... G06F 40/45 704/2 |

(Continued)

OTHER PUBLICATIONS

Smith, Ronnie W., et al., Spoken Natural Language Dialog Systems, a Practical Approach, Oxford University Press (excerpts), 1994, pp. 1-37.
(Continued)

*Primary Examiner* — Daniel C Washburn
*Assistant Examiner* — Paul J. Mueller
(74) *Attorney, Agent, or Firm* — Botos Churchill IP Law

(57) ABSTRACT

Systems and methods for automatic evaluation of the quality of NLG outputs. In some aspects of the technology, a learned evaluation model may be pretrained first using NLG model pretraining tasks, and then with further pretraining tasks using automatically generated synthetic sentence pairs. In some cases, following pretraining, the evaluation model may be further fine-tuned using a set of human-graded sentence pairs, so that it learns to approximate the grades allocated by the human evaluators. In some cases, following fine-tuning, the learned evaluation model may be distilled into a student model.

20 Claims, 9 Drawing Sheets

Related U.S. Application Data continuation-in-part of application No. 17/003,572, filed on Aug. 26, 2020, now Pat. No. 11,551,002.

(51) Int. Cl.
- *G06F 18/214* (2023.01)
- *G06F 40/30* (2020.01)
- *G06F 40/51* (2020.01)
- *G06N 3/08* (2023.01)

(52) U.S. Cl.
CPC .............. *G06F 40/30* (2020.01); *G06F 40/51* (2020.01); *G06N 3/08* (2013.01)

(58) Field of Classification Search
CPC ......... G06F 40/284; G06F 40/56; G06N 3/08; G06N 3/045
See application file for complete search history.

(56) References Cited

U.S. PATENT DOCUMENTS

| | | | | |
|---|---|---|---|---|
| 2016/0117316 | A1* | 4/2016 | Le | G06F 7/023 704/9 |
| 2017/0060855 | A1* | 3/2017 | Song | G06F 40/55 |
| 2020/0210772 | A1* | 7/2020 | Bojar | G06F 18/2148 |
| 2021/0174204 | A1* | 6/2021 | Yin | G06F 40/279 |
| 2021/0182662 | A1* | 6/2021 | Lai | G06F 40/284 |
| 2021/0365837 | A1 | 11/2021 | Kashihara et al. | |
| 2022/0067285 | A1 | 3/2022 | Sellam et al. | |
| 2022/0067309 | A1 | 3/2022 | Sellam et al. | |

OTHER PUBLICATIONS

Stanojevic, Milos, et al., BEER: BEtter Evaluation as Ranking, Proceedings of the Ninth Workshop on Statistical Machine Translation, pp. 414-419, 2014.

Sutskever, Ilya, et al., Sequence to Sequence Learning with Neural Networks, arXiv:1409.3215v3, Dec. 14, 2014.

Tian, Ran, et al., Sticking to the Facts: Confident Decoding for Faithful Data-To-Text Generation, arXiv:1910.08684v1, Oct. 19, 2019, pp. 1-12.

Tian, Ran, et al., Sticking to the Facts: Confident Decoding for Faithful Data-To-Text Generation, arXiv:1910.08684v2, Nov. 15, 2019, pp. 1-16.

Tomar, Gaurav Singh, et al., Neural Paraphrase Identification of Questions with Noisy Pretraining, Proceedings of the First Workshop on Subword and Character Level Models in NLP, 2017, pp. 142-147.

Turc, Iulia, et al., Well-Read Students Learn Better: On the Importance of Pre-Training Compact Models, Google Research, Sep. 25, 2019, pp. 1-13, arXiv:1908.08962v2 [cs.CL].

Turc, Iulia, et al., Well-Read Students Learn Better: The Impact of Student Initialization on Knowledge Distillation, arXiv:1908.08962v1 [cs.CL] Sep. 23, 2019, pp. 1-12.

Vaswani, Ashish, et al., Attention Is All You Need, 31st Conference on Neural Information Processing Systems (NIPS 2017), pp. 1-11.

Vinyals, Orio, et al., A Neural Conversational Model, arXiv:1506.05869v3, Jul. 22, 2015, pp. 1-8.

Wang, Alex, et al., GLUE: A Multi-Task Benchmark and Analysis Platform for Natural Language Understanding, Proceedings of the 2018 EMNLP Workshop BlackboxNLP: Analyzing and Interpreting Neural Networks for NLP, pp. 353-355.

Wang, Alex, et al., GLUE: A Multi-Task Benchmark and Analysis Platform for Natural Language Understanding, Published as a conference paper at ICLR 2019, arXiv:1804.07461v3, Feb. 22, 2019, pp. 1-20.

Wieting, John, et al., Towards Universal Paraphrastic Sentence Embeddings, Published as a conference paper at ICLR 2016, arXiv:1511.08198v3 Mar. 4, 2016, pp. 1-19.

Williams, Adina, et al., A Broad-Coverage Challenge Corpus for Sentence Understanding through Inference, Proceedings of NAACL-HLT 2018, pp. 1112-1122.

Wiseman, Sam, et al., Challenges in Data-to-Document Generation, Proceedings of the 2017 Conference on Empirical Methods in Natural Language Processing, pp. 2253-2263.

Xenouleas, Stratos, et al., SUM-QE: a BERT-based Summary Quality Estimation Model, Proceedings of the 2019 Conference on Empirical Methods in Natural Language Processing and the 9th International Joint Conference on Natural Language Processing, pp. 6005-6011.

Zhang, Tianyi, et al., BERTSCORE: Evaluating Text Generation with BERT, arXiv:1904.09675v1, Apr. 21, 2019.

Zhang, Tianyi, et al., BERTSCORE: Evaluating Text Generation With BERT, arXiv:1904.09675v3, Feb. 24, 2020, pp. 1-43.

Zhang, Tianyi, et al., BERTSCORE: Evaluating Text Generation With BERT, arXiv:1904.09675v2, Oct. 1, 2019, pp. 1-41.

Zhao, Wei, et al., "MoverScore: Text Generation Evaluating with Contextualized Embeddings and Earth Mover Distance", Proceedings of the 2019 Conference on Empirical Methods in Natural Language Processing and the 9th International Joint Conference on Natural Language Processing, pp. 563-578.

Bahdanau, Dzmitry, et al., Neural Machine Translation, by Jointly Learning to Align and Translate, arXiv:1409.0473v7, May 19, 2016, pp. 1-15.

Bannard, Colin, et al., Paraphrasing with Bilingual Parallel Corpora, Proceedings of the 43rd Annual Meeting of the ACL, pp. 597-604, Ann Arbor, Jun. 2005, Association for Computational Linguistics.

Belinkov, Yonatan, et al., Synthetic and Natural Noise Both Break Neural Machine Translation, Published as a conference paper at ICLR 2018, pp. 1-13.

Belz, Anja, et al., Comparing Automatic and Human Evaluation of NLG Systems, 11th Conference of the European Chapter of the Association for Computational Linguistics, www.aclweb.org, 2006, pp. 1-8.

Bojar, Ondrej, Results of the WMT16 Metrics Shared Task, Proceedings of the First Conference on Machine Translation, vol. 2: Shared Task Papers, 2016, pp. 199-231.

Bojar, Ondrej, et al., Results of the WMT17 Metrics Shared Task, Proceedings of the Conference on Machine Translation (WMT), vol. 2: Shared Task Papers, 2017, pp. 489-513.

Bowman, Samuel, et al., A large annotated corpus for learning natural language inference, Proceedings of the 2015 Conference on Empirical Methods in Natural Language Processing, pp. 632-642, 2015.

Callison-Burch, Chris, et al., Re-evaluating the Role of BLEU in Machine Translation Research, 11th Conference of the European Chapter of the Association for Computational Linguistics, https://www.aclweb.org/anthology/E06-1032.pdf, 2006, pp. 1-8.

Celikyilmaz, Asli, et al., Evaluation of Text Generation: A Survey, arXiv:2006.14799v1, Jun. 26, 2020, pp. 1-58.

Chaganty, Arun Tejasvi, et al., The price of debiasing automatic metrics in natural language evaluation, Proceedings of the 56th Annual Meeting of the Association for Computational Linguistics (Long Papers), pp. 643-653, 2018.

Chen, Qian, et al., Enhanced LSTM for Natural Language Inference, Proceedings of the 55th Annual Meeting of the Association for Computational Linguistics, pp. 1657-1668, 2017.

Chopra, Sumit, et al., Abstractive Sentence Summarization with Attentive Recurrent Neural Networks, Proceedings of NAACL-HLT 2016, pp. 93-98.

Clark, Elizabeth, et al., Sentence Mover's Similarity: Automatic Evaluation for Multi-Sentence Texts, Proceedings of the 57th Annual Meeting of the Association for Computational Linguistics, Jul. 28-Aug. 2, 2019, pp. 1-13, Florence, Italy.

Clark, Elizabeth, et al., Sentence Mover's Similarity: Automatic Evaluation for Multi-Sentence Texts, Proceedings of the 57th Annual Meeting of the Association for Computational Linguistics, Jul. 28-Aug. 2, 2019, pp. 2748-2760, Florence, Italy.

Devlin, Jacob, et al., BERT: Pre-training of Deep Bidirectional Transformers for Language Understanding, Proceedings of NAACL-HLT 2019, pp. 4171-4186.

(56) References Cited

OTHER PUBLICATIONS

Dusek, Ondrej, et al., Automatic Quality Estimation for Natural Language Generation: Ranting (Jointly Rating and Ranking), In Proceedings of INLG, Tokyo, Japan, Oct. 2019, arXiv:1910.04731v1, pp. 1-9.
Dusek, Ondrej, et al., Automatic Quality Estimation for Natural Language Generation: Ranting (Jointly Rating and Ranking), Proceedings of the 12th International Conference on Natural Language Generation, pp. 369-376, 2019.
Dusek, Ondrej, et al., Referenceless Quality Estimation for Natural Language Generation, arXiv:1708.01759v1, Aug. 5, 2017, pp. 1-9.
Eyal, Matan, et al., Question Answering as an Automatic Evaluation Metric for News Article Summarization, Proceedings of NAACL-HLT 2019, pp. 3938-3948.
Fang, Hao, et al., From Captions to Visual Concepts and Back, CVPR 2015, pp. 1-10.
Ganitkevitch, Juri, et al., PPDB: The Paraphrase Database, Proceedings of NAACL-HLT 2013, pp. 758-764.
Gardent, Claire, et al., The WebNLG Challenge: Generating Text from RDF Data, Proceedings of the 10th International Natural Language Generation conference, 2017, pp. 124-133.
Goodrich, Ben, et al., Assessing the Factual Accuracy of Generated Text, Research Track Paper, KDD '19, Aug. 4-8, 2019, Anchorage, AK, USA, pp. 166-175.
Hinton, Geoffrey, et al., "Distilling the Knowledge in a Neural Network," arXiv:1503.02531v1 [stat.ML] Mar. 9, 2015, pp. 1-9.
Iyyer, Mohit, et al., Adversarial Example Generation with Syntactically Controlled Paraphrase Networks, Proceedings of NAACL-HLT 2018, pp. 1875-1885.
Jia, Robin, et al., Adversarial Examples for Evaluating Reading Comprehension Systems, Proceedings of the 2017 Conference on Empirical Methods in Natural Language Processing, pp. 2021-2031.
Koehn, Philipp, Statistical Machine Translation, Cambridge University Press, 2009, pp. 1-20.
Kukich, Karen, Design of a Knowledge-Based Report Generator, University of Pittsburgh, Bell Telephone Laboratories, 1983, pp. 145-150.
Lin, Chin-Yew, Rouge: A Package for Automatic Evaluation of Summaries, in Proceedings of Workshop on Text Summarization Branches Out, Post-Conference Workshop of ACL 2004, pp. 1-10.
Liu, Yinhan, ROBERTa: A Robustly Optimized BERT Pretraining Approach, arXiv:1907.11692v1, Jul. 26, 2019, pp. 1-13.
Liu, Chia-Wei, et al., How Not to Evaluate Your Dialogue System: An Empirical Study of Unsupervised Evaluation Metrics for Dialogue Response Generation, Proceedings of the 2016 Conference on Empirical Methods in Natural Language Processing, pp. 2122-2132.
Lo, Chi-Kiu, "YiSi—A unified semantic MT quality evaluation and estimation metric for languages with different levels of available resources," Proceedings of the Fourth Conference on Machine Translation (WMT), vol. 2: Shared Task Papers (Day 1), 2019, Florence, IT., pp. 1-7.
Ma, Qingsong, et al., Blend: a Novel Combined MT Metric Based on Direct Assessment, CASICT-DCU submission to WMT17 Metrics Task, Proceedings of the Conference on Machine Translation (WMT), vol. 2: Shared Task Papers, pp. 598-603, 2017.
Ma, Qingsong, et al., Results of the WMT18 Metrics Shared Task, Proceedings of the Third Conference on Machine Translation (WMT), vol. 2: Shared Task Papers, pp. 671-688, 2018.
Ma, Qingsong, et al., Results of the WMT19 Metrics Shared Task: Segment-Level and Strong MT Systems Pose Big Challenges, Proceedings of the Fourth Conference on Machine Translation (WMT), vol. 2: Shared Task Papers (Day 1) pp. 62-90, 2019.
Mani, Inderjeet, et al., Advances in Automatic Text Summarization, the MIT Press, Copyright 1999, pp. 1-32.
Mathur, Nitika, et al., Putting Evaluation in Context: Contextual Embeddings improve Machine Translation Evaluation, Proceedings of the 57th Annual Meeting of the Association for Computational Linguistics, pp. 2799-2808, 2019.
Mathur, Nitika, et al., "Tangled up in BLEU: Reevaluating the Evaluation of Automatic MachineTranslation Evaluation Metrics", Proceedings of the 58th Annual Meeting of the Association for Computational Linguistics, Jul. 5-10, 2020, pp. 1-14, the University Melbourne, Victoria, Australia.
Novikova, Jekaterina, et al., Why We Need New Evaluation Metrics for NLG, Proceedings of the 2017 Conference on Empirical Methods in Natural Language Processing, pp. 2241-2252.
Papineni, Kishore, et al., BLEU: a Method for Automatic Evaluation of Machine Translation, Proceedings of the 40th Annual Meeting of the Association for Computational Linguistics (ACL), Philadelphia, Jul. 2002, pp. 311-318.
Ribeiro, Marco Tulio, et al., Semantically Equivalent Adversarial Rules for Debugging NLP Models, Proceedings of the 56th Annual Meeting of the Association for Computational Linguistics (Long Papers), pp. 856-865, 2018.
Sellam, Thibault, BLEURT: Learning Robust Metrics for Text Generation, arXiv:2004.04696v4, May 20, 2020, pp. 1-12.
Sellam, Thibault, et al., BLEURT: Learning Robust Metrics for Text Generation, arXiv:2004.04696v1, Apr. 9, 2020, pp. 1-12.
Sellam, Thibault, et al., BLEURT: Learning Robust Metrics for Text Generation, arXiv:2004.04696v2, May 11, 2020, pp. 1-12.
Sellam, Thibault, et al., BLEURT: Learning Robust Metrics for Text Generation, arXiv:2004.04696v3, May 14, 2020, pp. 1-12.
Sellam, Thibault, et al., BLEURT: Learning Robust Metrics for Text Generation, arXiv:2004.04696v5, May 21, 2020, pp. 1-12.
Sellam, Thibault, et al., Evaluating Natural Language Generation with BLEURT, Google AI Blog: Evaluating Natural Language Generation with BLEURT, May 26, 2020, https://ai.googleblog.com/2020/05/evaluating-natural-language-generation.html, pp. 1-5.
Sennrich, Rico, et al., Improving Neural Machine Translation Models with Monolingual Data, Proceedings of the 54th Annual Meeting of the Association for Computational Linguistics, pp. 86-96, 2016.
Shimanaka, Hiroki, et al., RUSE: Regressor Using Sentence Embeddings for Automatic Machine Translation Evaluation, Proceedings of the Third Conference on Machine Translation (WMT), vol. 2: Shared Task Papers, pp. 751-758, 2018.
Shimorina, Anastasia, et al., WebNLG Challenge: Human Evaluation Results, Jan. 2018, pp. 1-16.

* cited by examiner

502

Select a passage of text (passage A) from a source document

504

Randomly select one or more words in passage A to be replaced

506

Replace each selected word in passage A with a replacement word
to create a second passage of text (passage B)

Select a passage of text (passage A) from a source document, passage A being in a first language

704

Translate passage A from the first language into a second language to create a second passage (passage A')

706

Translate passage A' from the second language back into the first language to create a third passage (passage B)

LEARNED EVALUATION MODEL FOR GRADING QUALITY OF NATURAL LANGUAGE GENERATION OUTPUTS

CROSS-REFERENCE TO RELATED APPLICATIONS

This application is a continuation of U.S. patent application Ser. No. 17/112,285, filed Dec. 4, 2020, which is a continuation-in-part of U.S. patent application Ser. No. 17/003,572, filed Aug. 26, 2020, issued as U.S. Pat. No. 11,551,002, the entire disclosures of which are hereby incorporated by reference in their entirety.

BACKGROUND

In recent years, research in natural language generation ("NLG") has made tremendous progress, with models now able to translate text, summarize articles, engage in conversation, and comment on pictures with unprecedented accuracy, using approaches with increasingly high levels of sophistication. The pace of development in this area has created a need for an efficient way of evaluating the quality (e.g., accuracy and fluency) of an NLG model's output. Currently, there are two general approaches to evaluating the performance of NLG systems: human evaluation and automatic metrics. Human evaluation typically involves a large-scale quality survey for each new version of an NLG model in which human evaluators grade the NLG model's outputs, e.g., by comparing how well a sentence created by an NLG model matches the meaning and fluency of a reference sentence created by a human. While humans are unrivaled in their ability to flexibly interpret and compare language samples, using human evaluators for large-scale tests can be prohibitively time- and labor-intensive. On the other hand, existing automatic metrics are efficient and can be run on demand, but can be overly literal and provide inconsistent results compared to human evaluators.

BRIEF SUMMARY

The present technology relates to improved systems and methods for automatic evaluation of the quality of NLG outputs. In that regard, in some aspects of the technology, a learned evaluation model may be pretrained first using NLG model pretraining tasks, and then with further pretraining tasks using automatically generated ("synthetic") sentence pairs. In some aspects, following pretraining, the evaluation model may be further fine-tuned using a set of human-graded sentence pairs, so it learns to approximate the grades allocated by the human evaluators. Using this combination of pretraining and fine-tuning steps, the evaluation model can produce grades that are up to 48% more accurate (relative to human gradings) than other automatic metrics such as the BLEU metric. In addition, some aspects, following fine-tuning, the evaluation model may be distilled into a student model that can mimic the grades output by the evaluation model. The student model may one that is simpler, smaller, optimized for different technology, and/or trained on a smaller number of languages than the original evaluation model.

In one aspect, the disclosure describes a method of training a neural network, comprising: (i) generating, by one or more processors of a processing system, for each given synthetic sentence pair of a plurality of synthetic sentence pairs comprising an original passage of text and a modified passage of text: a first training signal of a plurality of training signals based on whether the given synthetic sentence pair was generated using backtranslation; and one or more second training signals of the plurality of training signals based on a prediction from a backtranslation prediction model regarding a likelihood that one of the original passage of text or the modified passage of text of the given synthetic sentence pair could have been generated by back-translating the other one of the original passage of text or the modified passage of text of the given synthetic sentence pair; (ii) training, by the one or more processors, a neural network based on each given synthetic sentence pair of the plurality of synthetic sentence pairs and the plurality of training signals, and further based on a plurality of human-graded sentence pairs; (iii) generating, by the one or more processors, a plurality of graded sentence pairs, each graded sentence pair of the plurality of graded sentence pairs comprising an original passage of text and a modified passage of text and a grade generated by the neural network based on the original passage of text and the modified passage of text; and (iv) training, by the one or more processors, a student network to predict, for each given graded sentence pair in a plurality of graded sentence pairs, the grade generated by the neural network. In some aspects, the plurality of synthetic sentence pairs comprises text in a plurality of different languages, and the plurality of graded sentence pairs comprises text in only a subset of the plurality of different languages. In some aspects, generating the plurality of graded sentence pairs comprises, for each given graded sentence pair of a first subset of the graded sentence pairs, substituting one or more words of the original passage of text of the given graded sentence pair to create the modified passage of text of the given graded sentence pair. In some aspects, generating the plurality of graded sentence pairs further comprises, for each given graded sentence pair of a second subset of the graded sentence pairs, removing one or more words of the original passage of text of the given graded sentence pair to create the modified passage of text the modified passage of text of the given graded sentence pair. In some aspects, generating the plurality of graded sentence pairs further comprises, for each given graded sentence pair of a third subset of the graded sentence pairs: translating, by the one or more processors, the original passage of text of the given graded sentence pair from a first language into a second language, to create a translated passage of text; and translating, by the one or more processors, the translated passage of text from the second language into the first language, to create the modified passage of text of the given graded sentence pair. In some aspects, the method further comprises generating, by the one or more processors, the plurality of synthetic sentence pairs; and generating the plurality of synthetic sentence pairs comprises: for each given synthetic sentence pair of a first subset of the synthetic sentence pairs, substituting one or more words of the original passage of text of the given synthetic sentence pair to create the modified passage of text of the given synthetic sentence pair; and for each given synthetic sentence pair of a second subset of the synthetic sentence pairs, removing one or more words of the original passage of text of the given synthetic sentence pair to create the modified passage of text of the given synthetic sentence pair. In some aspects, generating the plurality of synthetic sentence pairs further comprises, for each given synthetic sentence pair of a third subset of the synthetic sentence pairs: translating, by the one or more processors, the original passage of text of the given synthetic sentence pair from a first language into a second language, to create a translated passage of text; and translating, by the one or more processors, the translated passage of text from the second language into the first language, to create the modified passage of text of the given synthetic sentence pair. In some aspects, the method further comprises generating, by the one or more processors, for each given synthetic sentence pair of the plurality of synthetic sentence pairs: one or more third training signals of the plurality of training signals based on one or more scores generated by comparing the original passage of text of the given synthetic sentence pair to the modified passage of text of the given synthetic sentence pair using one or more automatic metrics. In some aspects, the method further comprises generating, by the one or more processors, for each given synthetic sentence pair of the plurality of synthetic sentence pairs: one or more fourth training signals of the plurality of training signals based on a prediction from a textual entailment model regarding a likelihood that the modified passage of text of the given synthetic sentence pair entails or contradicts the original passage of text of the given synthetic sentence pair. In some aspects, training the neural network based on each given synthetic sentence pair of the plurality of synthetic sentence pairs and the plurality of training signals, and further based on a plurality of human-graded sentence pairs comprises: pretraining, by the one or more processors, the neural network to predict, for each given synthetic sentence pair of the plurality of synthetic sentence pairs, the plurality of training signals for the given synthetic sentence pair; and fine-tuning, by the one or more processors, the neural network to predict, for each given human-graded sentence pair of a plurality of human-graded sentence pairs, a grade allocated by a human grader to the given human-graded sentence pair.

In another aspect, the disclosure describes a processing system comprising: a memory; and one or more processors coupled to the memory. The one or more processors are configured to: (i) generate, for each given synthetic sentence pair of a plurality of synthetic sentence pairs comprising an original passage of text and a modified passage of text: a first training signal of a plurality of training signals based on whether the given synthetic sentence pair was generated using backtranslation; and one or more second training signals of the plurality of training signals based on a prediction from a backtranslation prediction model regarding a likelihood that one of the original passage of text or the modified passage of text of the given synthetic sentence pair could have been generated by backtranslating the other one of the original passage of text or the modified passage of text of the given synthetic sentence pair; (ii) train a neural network based on each given synthetic sentence pair of the plurality of synthetic sentence pairs and the plurality of training signals, and further based on a plurality of human-graded sentence pairs; (iii) generate a plurality of graded sentence pairs, each graded sentence pair of the plurality of graded sentence pairs comprising an original passage of text and a modified passage of text and a grade generated by the neural network based on the original passage of text and the modified passage of text; and (iv) train a student network to predict, for each given graded sentence pair in a plurality of graded sentence pairs, the grade generated by the neural network. In some aspects, the one or more processors being configured to generate the plurality of graded sentence pairs comprises being configured to, for each given graded sentence pair of a first subset of the graded sentence pairs, substitute one or more words of the original passage of text of the given graded sentence pair to create the modified passage of text of the given graded sentence pair. In some aspects, the one or more processors being configured to generate the plurality of graded sentence pairs further comprises being configured to, for each given graded sentence pair of a second subset of the graded sentence pairs, remove one or more words of the original passage of text of the given graded sentence pair to create the modified passage of text the modified passage of text of the given graded sentence pair. In some aspects, the one or more processors being configured to generate the plurality of graded sentence pairs further comprises being configured to, for each given graded sentence pair of a third subset of the graded sentence pairs: translate the original passage of text of the given graded sentence pair from a first language into a second language, to create a translated passage of text; and translate the translated passage of text from the second language into the first language, to create the modified passage of text of the given graded sentence pair. In some aspects, the one or more processors are further configured to generate the plurality of synthetic sentence pairs. In some aspects, the one or more processors being configured to generate the plurality of synthetic sentence pairs comprises being configured to: for each given synthetic sentence pair of a first subset of the synthetic sentence pairs, substitute one or more words of the original passage of text of the given synthetic sentence pair to create the modified passage of text of the given synthetic sentence pair; and for each given synthetic sentence pair of a second subset of the synthetic sentence pairs, remove one or more words of the original passage of text of the given synthetic sentence pair to create the modified passage of text of the given synthetic sentence pair. In some aspects, the one or more processors being configured to generate the plurality of synthetic sentence pairs further comprises being configured to, for each given synthetic sentence pair of a third subset of the synthetic sentence pairs: translate the original passage of text of the given synthetic sentence pair from a first language into a second language, to create a translated passage of text; and translate the translated passage of text from the second language into the first language, to create the modified passage of text of the given synthetic sentence pair. In some aspects, the one or more processors are further configured to generate, for each given synthetic sentence pair of the plurality of synthetic sentence pairs: one or more third training signals of the plurality of training signals based on one or more scores generated by comparing the original passage of text of the given synthetic sentence pair to the modified passage of text of the given synthetic sentence pair using one or more automatic metrics. In some aspects, the one or more processors are further configured to generate, for each given synthetic sentence pair of the plurality of synthetic sentence pairs: one or more fourth training signals of the plurality of training signals based on a prediction from a textual entailment model regarding a likelihood that the modified passage of text of the given synthetic sentence pair entails or contradicts the original passage of text of the given synthetic sentence pair. In some aspects, the one or more processors being configured to train the neural network based on each given synthetic sentence pair of the plurality of synthetic sentence pairs and the plurality of training signals, and further based on a plurality of human-graded sentence pairs comprises being configured to: pretrain the neural network to predict, for each given synthetic sentence pair of the plurality of synthetic sentence pairs, the plurality of training signals for the given synthetic sentence pair; and fine-tune the neural network to predict, for each given human-graded sentence pair of a plurality of human-graded sentence pairs, a grade allocated by a human grader to the given human-graded sentence pair.

BRIEF DESCRIPTION OF THE DRAWINGS

FIG. 5 is a flow diagram showing an exemplary method for generating a synthetic sentence pair using random substitutions, according to aspects of the disclosure.

FIG. 7 is a flow diagram showing an exemplary method for generating a synthetic sentence pair using backtranslation, according to aspects of the disclosure.

DETAILED DESCRIPTION

The present technology will now be described with respect to the following exemplary systems and methods.

Example Systems

Figure 1:
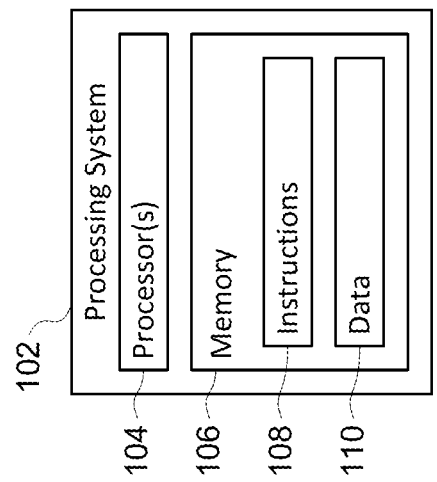
FIG. 1 is a functional diagram of an example system in accordance with aspects of the disclosure.

A high-level system diagram 100 of an exemplary processing system for performing the methods described herein is shown in FIG. 1. The processing system 102 may include one or more processors 104 and memory 106 storing instructions 108 and data 110. The instructions 108 and data 110 may include the evaluation model described herein, as well as some or all of the data used in pretraining and/or fine-tuning of the evaluation model. Similarly, the instructions 108 and data 110 may include the NLG model described herein. However, any of the evaluation model, NLG model, pretraining data, and/or fine-tuning data may also be maintained on one or more separate processing systems or storage devices to which the processing system 102 has access. For example, the evaluation model could be stored on a cloud-computing system, in which case the processing system 102 may provide input to, receive output from, and make changes to the evaluation model via one or more networks (not shown) in order to perform the pretraining and fine-tuning described herein. Likewise, the pretraining data and/or fine-tuning data may be stored on one or more remote servers, such as web servers, in which case the processing system 102 may retrieve data from such web servers and provide it to the evaluation model.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions 108 and data 110 that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C #, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Pretraining Evaluation Model Using NLG Pretraining Tasks

Figure 2:
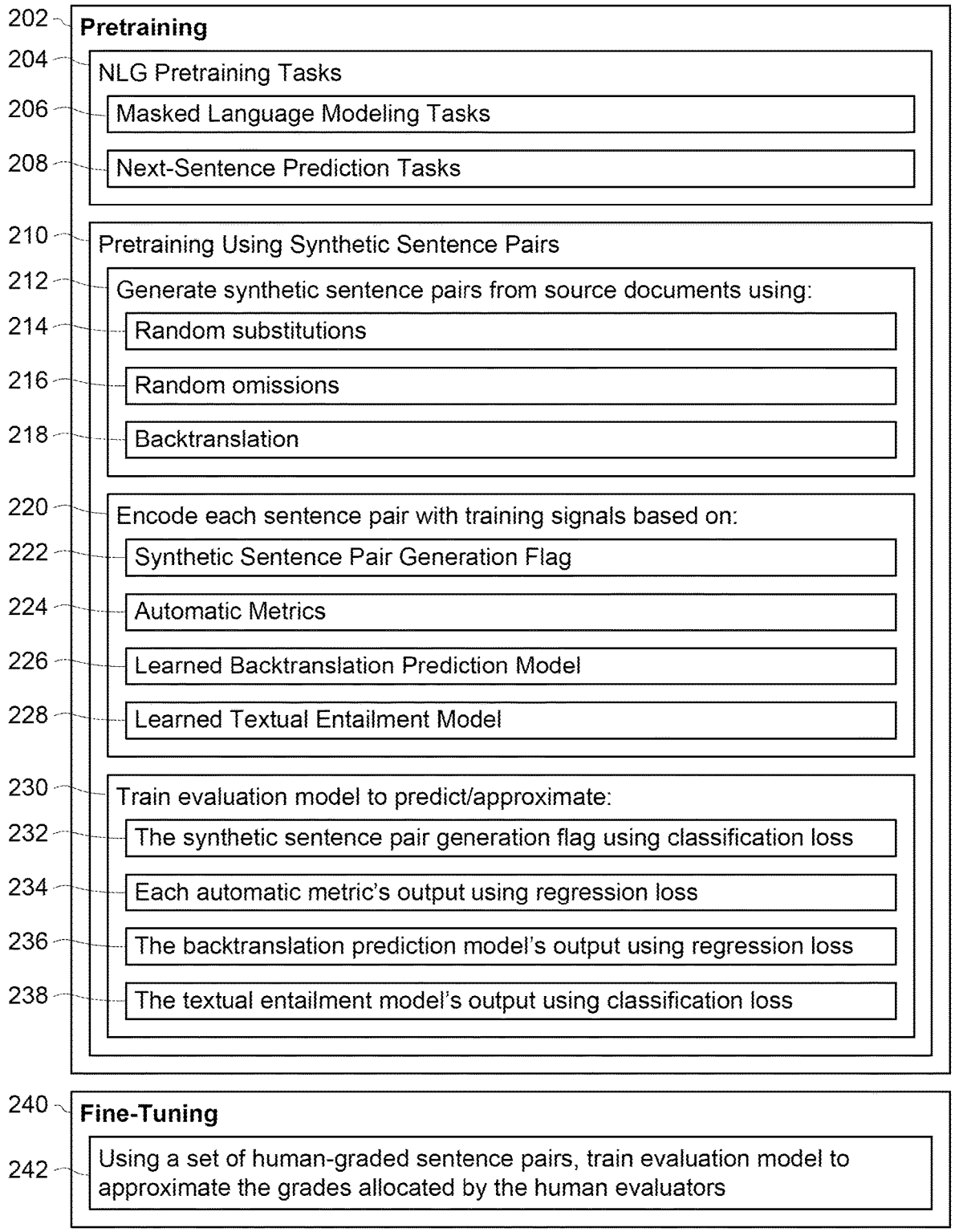
FIG. 2 depicts an example training protocol showing how an evaluation model may be pretrained and fine-tuned, according to aspects of the disclosure.

FIG. 2 depicts an example training protocol 200 showing how an evaluation model may be pretrained and fine-tuned according to aspects of the disclosure. In the example of FIG. 2, the evaluation model is a deep neural network with any suitable number of layers, units, heads, etc. For example, in some aspects of the technology, the evaluation model may be based on a multi-layer bidirectional transformer such as the architecture used for the Bidirectional Encoder Representations from Transformers ("BERT") language model. In that regard, in some aspects, the evaluation model may be based on a BERT-style transformer with 12 layers, 768 hidden units, and 12 heads. Likewise, in some aspects, the evaluation model may be based on a BERT-style transformer with 24 layers, 1024 hidden units, and 16 heads.

As shown in element 202 of FIG. 2, the evaluation model may be pretrained first using one or more types of NLG pretraining tasks 204. This may comprise any type or types of pretraining tasks suitable for imparting general language comprehension to the evaluation model. For example, as shown in the illustrative training protocol 200 of FIG. 2, the evaluation model may be trained using a set of masked language modeling tasks (as indicated in element 206) and/or a set of next-sentence prediction tasks (as indicated in element 208).

Figure 3:
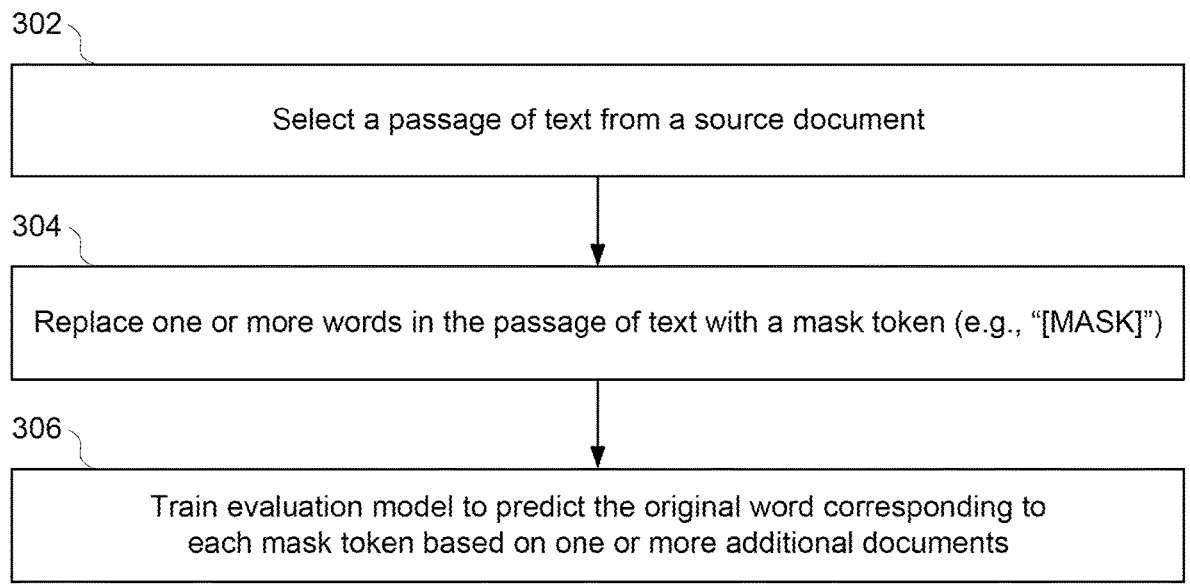
FIG. 3 is a flow diagram showing an exemplary method for pretraining the evaluation model using a masked language modeling task, according to aspects of the disclosure.

With further regard to element 206, FIG. 3 is a flow diagram showing an exemplary method 300 for pretraining the evaluation model using a masked language modeling task, according to aspects of the disclosure. In that regard, in step 302, a passage of text (e.g., a sentence fragment, sentence, multiple sentences) is harvested from a source document (e.g., a webpage from Wikipedia, a book, a news article). In step 304, one or more words from the passage are replaced with a mask token (e.g., "[MASK]"). Steps 302 and 304 may be performed manually (e.g., by a human), or automatically (e.g., by the evaluation model, by some other component of processing system 102, by some other processing system). Finally, in step 306, the evaluation model is trained to predict the original word corresponding to each mask token based at least in part on one or more additional documents from a knowledge corpus (e.g., other webpages from Wikipedia, other books, other news articles). The evaluation model may be trained using any suitable loss function, such as a cross-entropy loss between the evaluation model's prediction and the known answer of each masked language modeling task.

Figure 4:
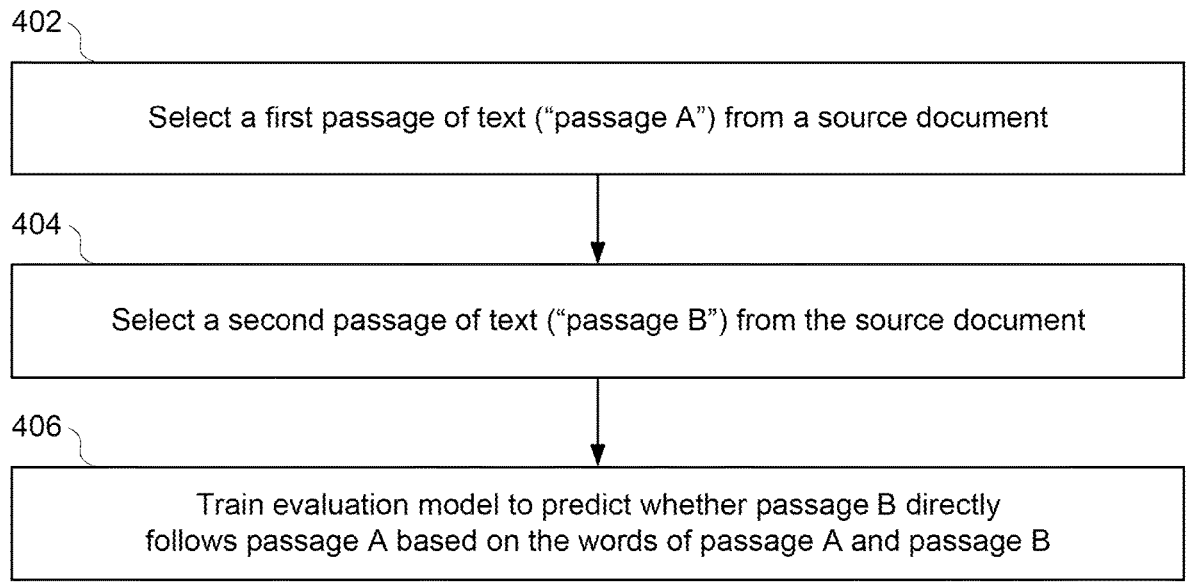
FIG. 4 is a flow diagram showing an exemplary method for pretraining the evaluation model using a next-sentence prediction task, according to aspects of the disclosure.

With further regard to element 208, FIG. 4 is a flow diagram showing an exemplary method 400 for pretraining the evaluation model using a next-sentence prediction task, according to aspects of the disclosure. In that regard, in step 402, a first passage of text ("passage 1") is selected from a source document (e.g., a webpage from Wikipedia, a book, a news article). Likewise, in step 404, a second passage of text ("passage 2") is selected from the same source document. In the example of FIG. 4, in 50% of the cases, passage 2 will be the text that directly follows passage 1 in the source document, and in 50% of cases passage 2 will be some other nonsequential passage of text selected at random from the remainder of the source document. In this context, passages 1 and 2 may be sentence fragments, single sentences, passages containing more than one sentence, passages containing a fixed number of words, etc. Here as well, steps 402 and 404 may be performed manually (e.g., by a human), or automatically (e.g., by the evaluation model, by some other component of processing system 102, by some other processing system). Finally, in step 406, the evaluation model is trained to predict whether passage 2 directly follows passage 1 based on the words of passage 1 and passage 2. In this case as well, the evaluation model may be trained using any suitable loss function, such as a cross-entropy loss between the evaluation model's prediction and the known answer of each next-sentence prediction task.

In the example of FIGS. 2-4, the masked language modeling tasks and the next-sentence prediction tasks may be run in parallel. In that regard, the training steps shown in step 306 of FIG. 3 and step 406 of FIG. 4 may take place in parallel, and the evaluation model may be trained through an iterative process of calculating and summing each of the losses described above, and modifying the evaluation model's parameters, until the mean combined loss value becomes minimized (or begins approaching a minimum value). The number of steps necessary to adequately pretrain the evaluation model using such masked language modeling and next-sentence prediction tasks may vary depending on the size of the passages and the number of possible tokens. For example, adequate NLG pretraining may require 1,000,000 training steps (or more or less).

Pretraining Evaluation Model Using Synthetic Sentence Pairs

Following pretraining on any NLG pretraining tasks 204 (to the extent such is employed), the evaluation model is pretrained using synthetic sentence pairs as shown in element 210 of FIG. 2. The processing system 102 may generate these synthetic sentence pairs from a set of source documents (e.g., webpages from Wikipedia, books, news articles), as reflected in element 212. Although the term "sentence pairs" is used in this context for simplicity, a synthetic sentence pair need not include two full sentences. Rather, a synthetic sentence pair may in fact be a pair of sentence fragments, or a pair of text passages that each include more than one sentence, etc.

AS shown in element 212, the processing system 102 may generate one or more different types of synthetic sentence pairs from the set of source documents, such as: sentence pairs in which one or more words of an original passage A are randomly replaced in order to create an altered passage B (as reflected in element 214); sentence pairs in which one or more words of an original passage A are randomly omitted to create an altered passage B (as reflected in element 216); and sentence pairs in which an original passage A is translated into a different language, and then retranslated back into the original language in order to create an altered passage B (as reflected in element 218). Exemplary methods for generating the synthetic sentence pairs reflected in elements 214, 216, and 218 are set forth in FIGS. 5, 6, and 7, respectively.

In that regard, FIG. 5 is a flow diagram showing an exemplary method 500 for generating a synthetic sentence pair using random substitutions, according to aspects of the disclosure. In step 502, the processing system 102 samples a passage of text (passage A) from a source document. In step 504, the processing system 102 randomly selects one or more words from passage A to be replaced. Finally, in step 506, the processing system 102 replaces each selected word in passage A with a replacement word, resulting in a second passage of text (passage B). In the context of FIG. 5, passage A and passage B together form a "sentence pair." The replacement words referred to in step 506 may be obtained from any suitable source. For example, in some aspects of the technology, a separate NLG model may be trained to provide each replacement word, so that the sentence is lexically altered while maintaining fluency. Likewise, in some aspects of the technology, a thesaurus may be used to provide a replacement word that has a similar meaning (in at least some contexts) to the selected word. Further, in some aspects of the technology, replacement words may be chosen at random, without regard to maintaining fluency and/or overall meaning of the sentence.

Figure 6:
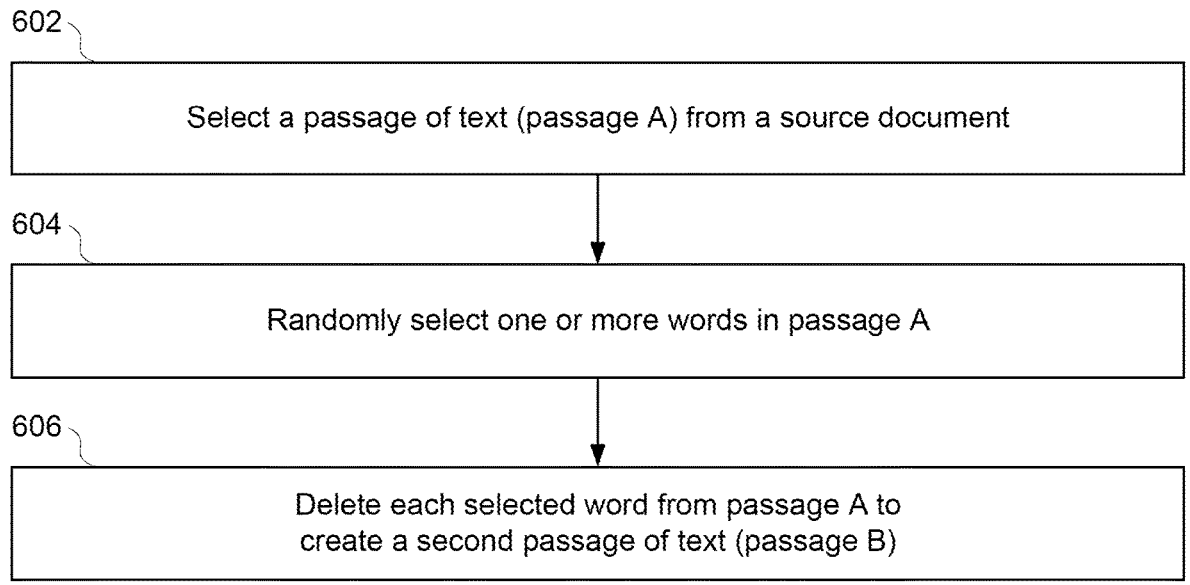
FIG. 6 is a flow diagram showing an exemplary method for generating a synthetic sentence pair using random omissions, according to aspects of the disclosure.

FIG. 6 is a flow diagram showing an exemplary method 600 for generating a synthetic sentence pair using random omissions, according to aspects of the disclosure. In step

602, the processing system 102 samples a passage of text (passage A) from a source document. In step 604, the processing system 102 randomly selects one or more words from passage A. Finally, in step 606, the processing system 102 deletes each selected word from passage A, resulting in a second passage of text (passage B). In the context of FIG. 6, passage A and passage B together form a "sentence pair."

FIG. 7 is a flow diagram showing an exemplary method 700 for generating a synthetic sentence pair using backtranslation, according to aspects of the disclosure. In step 702, the processing system 102 samples a passage of text (passage A) from a source document, with passage A being written in a first language (e.g., English). In step 704, the processing system 102 translates passage A from the first language into a second language (e.g., French, German), resulting in a second passage of text (passage A'). Finally, in step 706, the processing system 102 translates passage A' from the second language back into the first language, resulting in a third passage of text (passage B). In the context of FIG. 7, passage A and passage B together form a "sentence pair." With respect to steps 704 and 706, the processing system 102 may be configured to perform the translations between the first and second languages itself, or may be configured to obtain the translations from another processing system (e.g., a website available over one or more networks).

As shown in element 220, after the processing system 102 has generated synthetic sentence pairs, it may encode them with a set of training signals. In that regard, the processing system 102 may encode each synthetic sentence pair with training signals based on one or more of: a synthetic sentence pair generation flag (element 222); the output of one or more automatic metrics (element 224); the output of a learned backtranslation prediction model (element 226); and the output of a learned textual entailment model (element 228).

With respect to element 222, when the processing system 102 generates each synthetic sentence pair, it may also generate a Boolean flag indicating whether or not backtranslation was used to create the pair's "passage B." That Boolean flag may be encoded into the sentence pair as a training signal to be used in training the evaluation model, as described further below.

With respect to element 224, the processing system 102 may also evaluate each synthetic sentence pair using one or more existing automatic metrics, and encode each sentence pair with one or more training signals based on the score(s) produced by the one or more automatic metrics. Any suitable automatic metric or collection thereof may be used in this regard.

For example, in some aspects of the technology, each synthetic sentence pair may be evaluated using the BLEU metric, which calculates a score based on n-gram overlap between two passages. A training signal (e.g., a vector) may be encoded into each sentence pair that includes a value based on the sentence pair's BLEU score (e.g., the BLEU score itself, a normalized version of the BLEU score, etc.)

Likewise, in some aspects of the technology, each synthetic sentence pair may be evaluated using the ROUGE metric, which calculates three different scores based on n-gram overlap between two passages: a recall score indicating how many n-grams of passage A are repeated in passage B; a precision score indicating the percentage of the repeated n-grams relative to the total n-grams of passage B; and an F-score, which is a harmonic mean of the recall and precision scores. A training signal (e.g., a vector) may be encoded into each sentence pair that includes values based on one or more of the scores output by the ROUGE metric (e.g., one or more of the ROUGE scores themselves, normalized versions of one or more of ROUGE scores, etc.)

Further, in some aspects of the technology, each synthetic sentence pair may be evaluated using the BERTscore metric, which is a metric that combines learned contextual embeddings with specific token alignment rules to produce a recall, precision, and F-score. Here as well, a training signal (e.g., a vector) may be encoded into each sentence pair that includes values based on one or more of the scores output by the BERTscore metric for that sentence pair (e.g., one or more of the BERTscore scores themselves, normalized versions of one or more of BERTscore scores, etc.)

In some aspects of the technology, each sentence pair may be encoded with a first training signal based on the pair's BLEU score, a second training signal based on all three of the pair's ROUGE scores (recall, precision, and F-score), and a third training signal based on all three of the pair's BERTscore scores (recall, precision, and F-score). In some aspects of the technology, additional training signals may be based on other calculated or learned automatic metrics, and may be added to or substituted for one or more of those described herein.

With respect to element 226, the processing system 102 may also evaluate each synthetic sentence pair using a learned backtranslation prediction model. In that regard, a backtranslation prediction model may be trained to assess the probability that a first passage is a backtranslation of a second passage, or vice versa. The backtranslation model may be trained to make such a prediction based on translation between any two languages. For example, in some aspects of the technology, the backtranslation prediction model may be configured to analyze a sentence pair composed of passage A and passage B and return one or both of the following scores: (1) a score representing the likelihood that passage B is the result of translating passage A from English to French to get passage A', and translating passage A' from French back into English; and (2) a score representing the likelihood that passage A is the result of translating passage B from English to French to get passage B', and translating passage B' from French back into English.

Likewise, in some aspects, the backtranslation prediction model may be configured to make predictions based on translations between more than two languages. Thus, for example, the backtranslation prediction model may be configured analyze a sentence pair composed of passage A and passage B and return one or more of the following scores: (1) a score representing the likelihood that passage B is the result of translating passage A from English to French to get passage A', and translating passage A' from French back into English; (2) a score representing the likelihood that passage A is the result of translating passage B from English to French to get passage B', and translating passage B' from French back into English; (3) a score representing the likelihood that passage B is the result of translating passage A from English to German to get passage A', and translating passage A' from German back into English; and (4) a score representing the likelihood that passage A is the result of translating passage B from English to German to get passage B', and translating passage B' from German back into English. A training signal (e.g., a vector) may be encoded into each sentence pair that includes values based on one or more such scores output by the backtranslation prediction model for that sentence pair (e.g., one or more values actually output by the backtranslation prediction model, normalized versions of one or more values output by the backtranslation prediction model, etc.).

With respect to element 228, the processing system 102 may also evaluate each synthetic sentence pair using a learned textual entailment model. The textual entailment model may be trained to assign a probability that a first passage entails (tends to confirm or be in agreement with) a second passage, contradicts the second passage, or neither entails nor contradicts the second passage and is thus neutral. A training signal (e.g., a vector) may be encoded into each sentence pair that includes values based on the entailment, contradiction, and neutrality probabilities output by the textual entailment model for that sentence pair (e.g., the actual predictions output by the textual entailment model, normalized versions of the textual entailment model's predictions, etc.)

After the processing system 102 has encoded each synthetic sentence pair with one or more training signals as just described, they are used to train the evaluation model. In that regard, the evaluation model is fed each synthetic sentence pair (without the encoded training signals), and is trained to predict each score based on the text of the synthetic sentence pairs. In each training step, the model's predictions are compared to each respective training signal and a loss value is generated. Although any suitable loss function(s) may be used, in the example of FIG. 2, the processing system 102 calculates: (1) a multi-class loss between each of the evaluation model's predictions and any respective training signals based on synthetic sentence pair generation flags (element 232 of FIG. 2); (2) a regression loss between each of the evaluation model's predictions and any respective training signals based on automatic metrics (element 234 of FIG. 2); (3) a regression loss between each of the evaluation model's predictions and any respective training signals based on a backtranslation prediction model (element 236 of FIG. 2); and (4) a multi-class loss between each of the evaluation model's predictions and any respective training signals based on a textual entailment model (element 238 of FIG. 2). Here as well, the evaluation model may be trained through an iterative process of calculating and summing each of the losses described above, and modifying the evaluation model's parameters, until the mean combined loss value becomes minimized (or begins approaching a minimum value). The number of steps necessary to adequately pretrain the evaluation model using encoded synthetic sentence pairs may vary depending on the size of the passages, the number of possible tokens, the number of training signals, etc. For example, adequate pretraining using the tasks and training signals just described may require between 400,000 and 800,000 training steps (or more or less).

Fine-Tuning Evaluation Model Using Human-Rated Sentence Pairs

As shown in elements 240 and 242 of FIG. 2, after the evaluation model has been pretrained using NLG pretraining tasks and synthetic sentence pairs as described above, it may be further fine-tuned using human-graded sentence pairs. As above, although the term "sentence pairs" is used for simplicity, a human-graded "sentence pair" need not include two full sentences, and may instead include sentence fragments, passages including more than one sentence, etc. In this fine-tuning stage, the evaluation model is trained to predict the human-allocated grade for each sentence-pair. Thus, the human-allocated grade may be used as a training signal, and a loss may be calculated between the evaluation model's prediction for each sentence pair and the respective human-allocated grade. Any suitable loss function may be used for this, such as a regression loss between the evaluation model's prediction and the human-allocated grade.

Here as well, the evaluation model may be fine-tuned through an iterative process of calculating and summing each loss value, and modifying the evaluation model's parameters, until the mean combined loss becomes minimized (or begins approaching a minimum value). The number of steps necessary to adequately fine-tune the evaluation model using encoded synthetic sentence pairs may vary depending on the size of the passages. For example, adequate fine-tuning using human-graded sentence pairs may require 40,000 training steps (or more or less).

The present technology may be used to assess any type of NLG output such as data-to-text summaries, machine-translation, conversational AI, etc., and the data used to fine-tune the evaluation model may be tailored to such intended use. Thus, in some aspects of the technology, the human-graded sentence pairs may include ones in which the first "sentence" is a reference passage created by a human based on some data (e.g., a human-generated sentence based on data about a sports match, and summarizing the outcome of the sports match), the second "sentence" is a passage that was synthetically generated by an NLG model based on that data, and the human-allocated grade is a score that has been allocated by a different human assessing how well the NLG-generated passage compares to the human-generated passage. Likewise, in some aspects of the technology, the human-graded sentence pairs may include ones in which the first "sentence" is a source passage written in a first language, the second "sentence" is a NLG-generated machine-translation of the first "sentence" into a second language, and the human-allocated grade represents how accurately the second passage is believed to capture the meaning of the first passage.

In addition, in some aspects of the present technology, the "sentence pairs" used for fine-tuning need not be the only information provided to the evaluation model, and thus may be augmented with further context. For example, for a "sentence pair" in which a human-graded reference sentence and an NLG-model-generated candidate sentence were both created by summarizing a passage of text, that passage of text may be provided to the evaluation model as additional input to be weighed in determining how well the NLG-generated passage compares to the human-generated passage. Likewise, for a "sentence pair" in which a human-graded reference sentence and an NLG-model-generated candidate sentence both represent a responsive communication in a written conversation, a log of that past conversation may be provided to the evaluation model as additional input to be weighed in determining how well the NLG-generated passage compares to the human-generated passage.

Distilling Evaluation Model

In some aspects of the technology, after the evaluation model has been fine-tuned, it may be desirable to distill the evaluation model into a student model trained to mimic the grades output by the evaluation model. This may be done for a variety of reasons. For example, in some aspects of the technology, the evaluation model may be distilled into a student model that is simpler and/or smaller than the evaluation model, and thus takes less resources to store and use. Likewise, in some aspects, where the evaluation model has been optimized to run on a particular hardware platform (e.g., a TPU, a GPU, an enterprise server, etc.), it may be distilled into a model that is optimized to run on a different hardware platform (e.g., a CPU, a mobile device, etc.). Further, in some aspects, the evaluation model may be trained and fine-tuned using data in multiple different languages, and distillation may be used to train a student model using data in a single language (or a smaller number of languages than the evaluation model was trained and fine-tuned on). In such cases, this may result in a student model that can be trained quickly and simply on only a single language, but which retains some of benefits of the evaluation model's broader multi-lingual comprehension.

Figure 8:
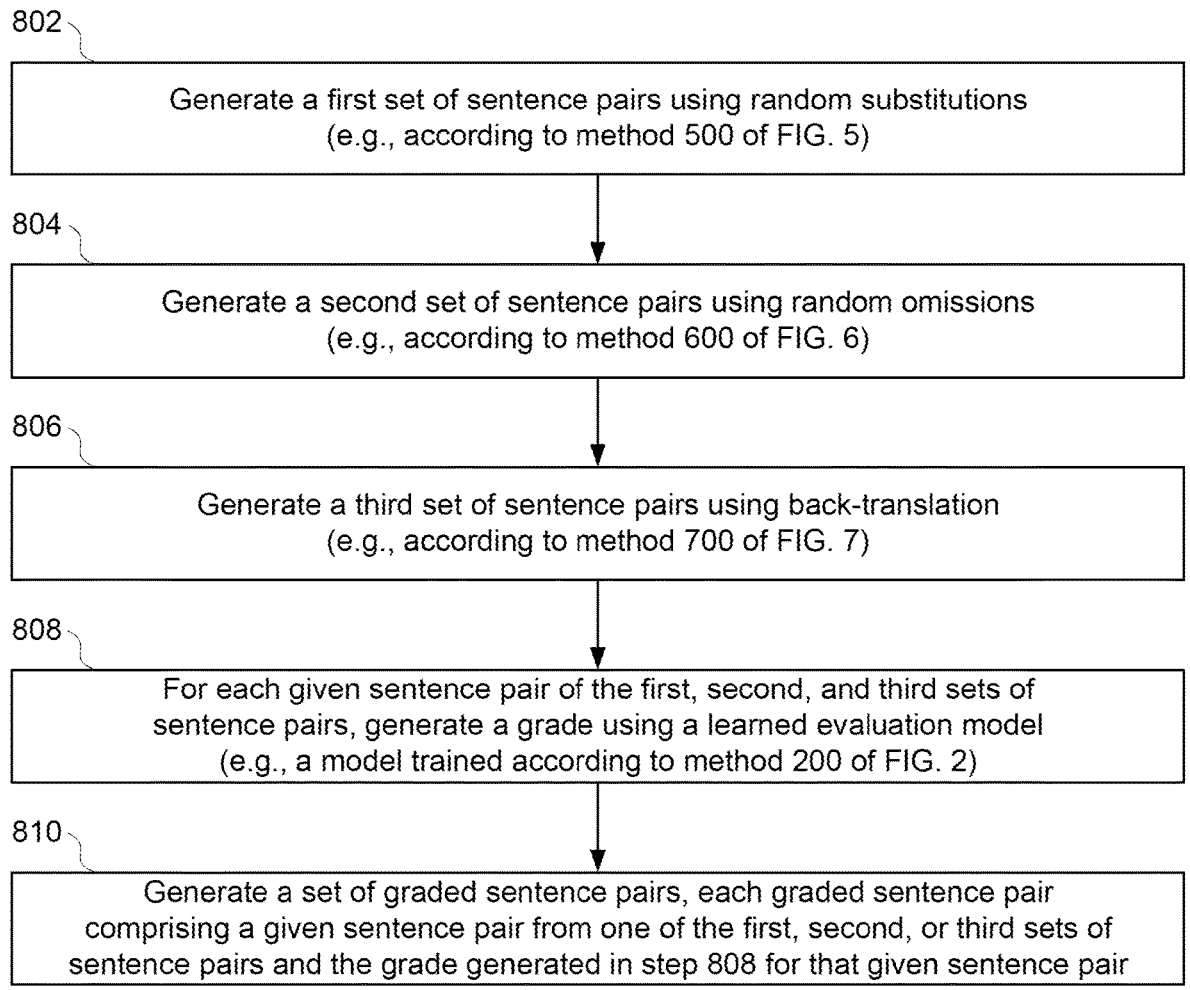
FIG. 8 is a flow diagram showing an exemplary method for generating distillation data for use in training a student model, according to aspects of the disclosure.

FIG. 8 is a flow diagram showing an exemplary method 800 for generating distillation data for use in training a student model, according to aspects of the disclosure. Method 800 begins with the creation of a collection of sentence pairs.

In step 802, the processing system 102 generates a first set of sentence pairs using random substitutions. This may be done as described above according to method 500 of FIG. 5.

In step 804, the processing system 102 generates a second set of sentence pairs using random omissions. This may be done as described above according to method 600 of FIG. 6.

In step 806, the processing system 102 generates a third set of sentence pairs using backtranslation. This may be done as described above according to method 700 of FIG. 7.

In step 808, the first, second, and third sets of sentence pairs are provided to a learned evaluation model for grading. The learned evaluation model in this instance is the model to be distilled. Thus, where it is desired to create a student model to mimic the output of an evaluation model generated according to the method 200 of FIG. 2, step 808 would entail providing the first, second, and third sets of sentence pairs to the evaluation model, which then grades each sentence pair as it has been trained to do (as described above).

In the example method 800, three different types of sentence pairs are generated in steps 802-806 and provided to the evaluation model in step 808. However, in some aspects of the technology, one or more of steps 802-806 may be omitted so that the collection of sentence pairs provided to the learned evaluation model in step 808 includes fewer types of sentence pairs. Likewise, in some aspects of the technology, one or more other sets of sentence pairs (e.g., a set of sentence pairs from an existing database such as the WMT Metrics Shared Task) may be included in the collection of sentence pairs that is provided to the learned evaluation model in step 808. In that regard, these one or more other sets of sentence pairs may be included in the collection along with the sets of sentence pairs generated in steps 802-806, or in place of one or more of the sets described in steps 802-806.

In step 810, the processing system 102 generates a set of graded sentence pairs. In that regard, each sentence pair graded in step 808 is combined with the grade it received from the evaluation model to create a graded sentence pair. Together, this set of graded sentence pairs represents the set of distillation data to be used in training the student model to mimic the output of the evaluation model, as will be described further below.

Figure 9:
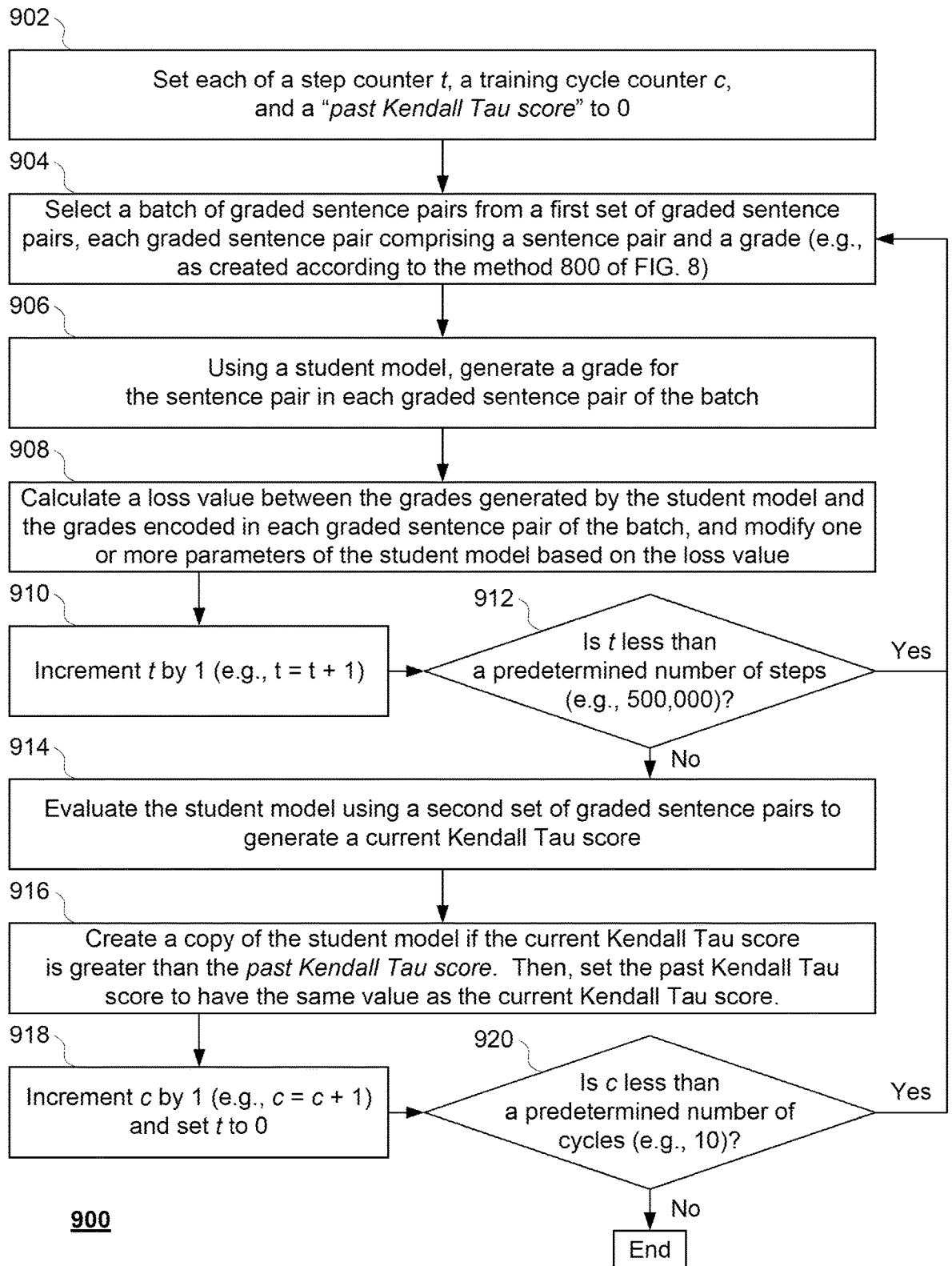
FIG. 9 is a flow diagram showing an exemplary method for training a student model to mimic the results of the evaluation model, according to aspects of the disclosure.

FIG. 9 is a flow diagram showing an exemplary method 900 for training a student model to mimic the results of the evaluation model. Method 900 sets forth exemplary steps for training a student model after it has been initialized. In that regard, as already mentioned above, the student model may utilize any suitable architecture, number of parameters, etc. In some cases, the student model may be a simpler model than the evaluation model. For example, in some aspects of the technology, the evaluation model may be based on a BERT-large model taking up 1.2 GB, while the student model is based on a BERT-base model taking up 390 MB, or on a BERT-tiny model taking up 15.8 MB. Likewise, in some cases, the student model may be one optimized to run on a different type of hardware than the evaluation model. For example, in some aspects of the technology, the evaluation model may be optimized to run on a TPU, a GPU, or an enterprise server, while the student model is one optimized to run on a personal computer, tablet, or mobile phone, or vice versa. In that regard, in some cases, optimizing for a different hardware profile may result in the student model being as large and complex as, or even larger and more complex than the evaluation model. Further, in some cases, the student model may be based on the same type of model as the evaluation model (same architecture and/or number of parameters), but may be distilled on a specific type of data. For example, the evaluation model may be a BERT-large based model pre-trained and/or fine-tuned on multiple languages (e.g., fifteen languages), while the student model may be a BERT-large based model trained using a set of distillation data including only a subset of those languages (e.g., only English, only French, English and French, etc.).

In any event, once a student model has been chosen and initialized, the exemplary method of FIG. 9 begins with step 902, where three variables are set to an initial value of 0. A first variable referred to herein as t represents the number of training steps completed. As will be explained below with respect to steps 910 and 912, this t value will be incremented after each training cycle concludes so that the processing system 102 can keep track of when each training cycle has been completed, and initiate an evaluation of the student model between cycles. A second variable referred to herein as c represents the number of training cycles completed, so that training can be stopped after a predetermined number of cycles. A third variable referred to herein as past Kendall Tau score represents the Kendall Tau score calculated following the previous training cycle so that it may be compared to the current Kendall Tau score to determine if the performance of the student model improved over the last training cycle.

In step 904, the processing system 102 selects a batch of graded sentence pairs to be used in the current training step. This batch may be any suitable size (e.g., any number of one or more graded sentence pairs), and is selected from within a first set of graded sentence pairs. In that regard, in the example of FIG. 9, the set of graded sentence pairs generated in step 810 of FIG. 8 is split into a first set of graded sentence pairs used for training steps 904-908, and a second set of graded sentence pairs used for the evaluation step 914. Each of the graded sentence pairs in the first and second sets of graded sentence pairs includes a sentence pair (e.g., generated in one of steps 802-806 of FIG. 8) and a grade allocated by the evaluation model (e.g., generated in step 808 of FIG. 8). However, as the second set of graded sentence pairs may be reused in each pass through evaluation step 914, the first set of graded sentence pairs may be much larger than the second set of graded sentence pairs. For example, the second set of graded sentence pairs may represent 5% of those generated in step 810 of FIG. 8, with the other 95% being allocated to the first set of graded sentence pairs.

In step 906, the batch of graded sentence pairs is provided to the student model, and the student model generates its own grade for the sentence pair in each graded sentence pair of the batch.

In step 908, the processing system 102 calculates a loss value between the grades generated by the student model and the corresponding grades encoded in each graded sentence pair of the batch (the grades previously generated by the evaluation model in step 808 of FIG. 8), and then modifies one or more of the student model's parameters based on that calculated loss value for the batch. In that regard, as steps 904-912 repeat for each next batch of graded sentence pairs, the student model is tuned through an iterative process of calculating and summing each loss value, and modifying the student model's parameters, until the mean combined loss becomes minimized (or begins approaching a minimum value). Here as well, any suitable loss function may be used for this, such as a regression loss between the student model's grades and the grades encoded in the each graded sentence pair of a given batch.

In step 910 the processing system 102 will increment the step counter t by one. In other words, the variable t is set to t+1.

In step 912, the processing system 102 determines whether t is less than some predetermined number of steps. As discussed above, this predetermined number of steps represents a training cycle, and may be any suitable number (e.g., 500,000 steps). As such, step 912 represents a determination of whether a training cycle has been completed. If t is less than that predetermined number, then the cycle has not yet been concluded, and the processing system returns to step 904 as indicated by the "Yes" arrow. At that point, steps 904-912 will be repeated for the next batch of graded sentence pairs from the first set of graded sentence pairs.

On the other hand, if t is not less than the predetermined number, then the cycle has been completed, and the processing system will proceed from step 912 to step 914 as indicated by the "No" arrow.

In step 914, the student model will be evaluated using the second set of graded sentence pairs. In that regard, the student model will grade each of the sentence pairs in the second set of graded sentence pairs, and the processing system 102 will compare each of the student model's grades against the corresponding encoded grade in order to arrive at a Kendall Tau score. Although the exemplary method 900 of FIG. 9 uses the Kendall Tau rank coefficient for this evaluation, any suitable method may be used for measuring the ordinal association between the set of grades provided by the student model and the encoded set of grades, such as Spearman's rho, Goodman and Kruskal's gamma, Somers' D, etc.

In step 916, the processing system 102 will compare the current Kendall Tau score that was just generated to the past Kendall Tau score variable. As explained above, in the first pass through step 914, the past Kendall Tau score variable will be set to 0. However, in the second pass and each successive pass thereafter, the past Kendall Tau score will represent the score calculated during the previous pass. In each case, if the current Kendall Tau score is greater than the past Kendall Tau score variable, then it indicates that the preceding training cycle improved the student model, and the processing system 102 will create a copy of the student model to save that progress. The processing system 102 will then set the past Kendall Tau score to have the same value as the current Kendall Tau score, thus saving it for comparison purposes during the next pass.

In step 918, the processing system 102 will increment the cycle counter c by one, and reset the step counter t to 0. As will be appreciated, any other suitable manner of keeping track of the number of training steps and the number of cycles may be substituted into method 900. For example, rather than maintaining a separate cycle counter variable, a single step counter t may be used to determine both how many training steps have taken place, and whether the current step indicates the end of a cycle (e.g., when t divided by the number of steps per cycle returns an integer value).

In step 920, the processing system 102 determines whether c is less than some predetermined number of cycles. This predetermined number of cycles represents the total number of training cycles to be undertaken, and may be any suitable number (e.g., 10 cycles, for a total of 5,000,000 steps). Step 920 thus represents a determination of whether training has been fully completed. If c is less than the predetermined number of cycles, then training has not yet been concluded, and the processing system returns to step 904 as indicated by the "Yes" arrow. At that point, steps 904-912 will be repeated for each next batch of graded sentence pairs in the first set of graded sentence pairs, and steps 914-918 will be repeated once that new training cycle has concluded.

On the other hand, if c is not less than the predetermined number of cycles, then training has been completed, and the method will end as indicated by the "No" arrow. At that point the resulting final student model may be compared to any previously stored copies (stored during each pass through step 916) to determine which is optimal.

Although the exemplary method 900 of FIG. 9 will repeat until a predetermined number of training steps have taken place, in some aspects of the technology, the method may instead conclude when a predetermined target Kendall Tau score is achieved at step 914. For example, the method 900 may be modified to repeat until, at step 914, a Kendall Tau score of 0.99 is calculated. Similarly, the method 900 may be modified to repeat until the current Kendall Tau score fails to exceed the past Kendall Tau score, or fails to improve the Kendall Tau Score by some predetermined threshold. For example, method 900 may be modified to repeat until, at step 916, the difference between the current and past Kendall Tau scores is calculated to be less than 0.01.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A method of training a neural network, comprising:
generating, by one or more processors of a processing system, for each given synthetic sentence pair of a plurality of synthetic sentence pairs comprising a first passage of text and a second passage of text:
a first training signal of a plurality of training signals based on whether the given synthetic sentence pair was generated using backtranslation; and
one or more second training signals of the plurality of training signals based on a model prediction regarding a likelihood that one of the first passage of text or the second passage of text of the given synthetic sentence pair could have been generated by backtranslating the other one of the first passage of text or the second passage of text of the given synthetic sentence pair;
generating, by the one or more processors, a plurality of graded sentence pairs, each graded sentence pair of the plurality of graded sentence pairs comprising an original passage of text and a modified passage of text and a grade generated by a trained neural network based on the original passage of text and the modified passage of text; and training, by the one or more processors, a student network to predict, for each given graded sentence pair in the plurality of graded sentence pairs, the grade generated by the neural network.

2. The method of claim 1, wherein the plurality of synthetic sentence pairs comprises text in a plurality of different languages, and the plurality of graded sentence pairs comprises text in only a subset of the plurality of different languages.

3. The method of claim 1, wherein generating the plurality of graded sentence pairs comprises, for each given graded sentence pair of a first subset of the graded sentence pairs, substituting one or more words of the original passage of text of the given graded sentence pair to create the modified passage of text of the given graded sentence pair.

4. The method of claim 3, wherein generating the plurality of graded sentence pairs includes removing one or more words of the original passage of text to create the modified passage of text.

5. The method of claim 1, further comprising generating the plurality of synthetic sentence pairs.

6. The method of claim 5, wherein generating the plurality of synthetic sentence pairs comprises substituting one or more words of the first passage of text to create the second passage of text.

7. The method of claim 1, further comprising generating, for each given synthetic sentence pair of the plurality of synthetic sentence pairs, one or more third training signals of the plurality of training signals based on one or more scores.

8. The method of claim 7, wherein the one or more scores are generated by comparing the first passage of text to the second passage of text using one or more automatic metrics.

9. The method of claim 1, further comprising training the neural network based on each given synthetic sentence pair and the plurality of training signals.

10. The method of claim 1, wherein training the neural network is further based on a plurality of human-graded sentence pairs.

11. The method of claim 10, wherein training the neural network includes:

pretraining the neural network to predict, for each given synthetic sentence pair of the plurality of synthetic sentence pairs, the plurality of training signals for the given synthetic sentence pair.

12. The method of claim 11, wherein training the neural network further includes:

fine-tuning the neural network to predict, for each given human-graded sentence pair of the plurality of human-graded sentence pairs, a grade allocated by a human grader to the given human-graded sentence pair.

13. A processing system comprising:
a memory; and
one or more processors coupled to the memory and configured to:
generate, for each given synthetic sentence pair of a plurality of synthetic sentence pairs comprising a first passage of text and a second passage of text:
a first training signal of a plurality of training signals based on whether the given synthetic sentence pair was generated using backtranslation; and
one or more second training signals of the plurality of training signals based on a model prediction regarding a likelihood that one of the first passage of text or the second passage of text of the given synthetic sentence pair could have been generated by backtranslating the other one of the first passage of text or the second passage of text of the given synthetic sentence pair;
generate a plurality of graded sentence pairs, each graded sentence pair of the plurality of graded sentence pairs comprising an original passage of text and a modified passage of text and a grade generated by a trained neural network based on the original passage of text and the modified passage of text; and
train a student network to predict, for each given graded sentence pair in the plurality of graded sentence pairs, the grade generated by the trained neural network.

14. The system of claim 13, wherein the one or more processors are further configured to, for each given graded sentence pair of a first subset of the graded sentence pairs, substitute one or more words of the original passage of text of the given graded sentence pair to create the modified passage of text of the given graded sentence pair.

15. The system of claim 14, wherein the one or more processors are further configured to, for each given graded sentence pair of a second subset of the graded sentence pairs, remove one or more words of the original passage of text of the given graded sentence pair to create the modified passage of text of the given graded sentence pair.

16. The system of claim 15, wherein the one or more processors are further configured to, for each given graded sentence pair of a third subset of the graded sentence pairs:

translate the original passage of text of the given graded sentence pair from a first language into a second language, to create a translated passage of text; and translate the translated passage of text from the second language into the first language, to create the modified passage of text of the given graded sentence pair.

17. The system of claim 13, wherein the one or more processors are further configured to generate the plurality of synthetic sentence pairs.

18. The system of claim 13, wherein the one or more processors are further configured to generate, for each given synthetic sentence pair of the plurality of synthetic sentence pairs:

one or more third training signals of the plurality of training signals based on one or more scores generated by comparing the first passage of text of the given synthetic sentence pair to the second passage of text of the given synthetic sentence pair.

19. The system of claim 18, wherein the one or more processors are further configured to generate, for each given synthetic sentence pair of the plurality of synthetic sentence pairs:

one or more fourth training signals of the plurality of training signals based on a prediction from a textual entailment model regarding a second likelihood that the second passage of text of the given synthetic sentence pair entails or contradicts the first passage of text of the given synthetic sentence pair.

20. The system of claim 13, wherein the one or more processors are configured to train the neural network based on each given synthetic sentence pair of the plurality of synthetic sentence pairs, the plurality of training signals, and a plurality of human-graded sentence pairs.

* * * * *